United States Patent [19]

Braunlich et al.

[11] Patent Number: 4,825,084
[45] Date of Patent: Apr. 25, 1989

[54] LASER READABLE THERMOLUMINESCENT RADIATION DOSIMETERS AND METHODS FOR PRODUCING THEREOF

[75] Inventors: Peter F. Braunlich, S.W. 730 City View, Pullman, Wash. 99163; Wolfgang Tetzlaff, Pullman, Wash.

[73] Assignee: Peter F. Braunlich, Pullman, Wash.

[21] Appl. No.: 897,992

[22] Filed: Aug. 19, 1986

[51] Int. Cl.$^4$ .............................................. G01T 1/11
[52] U.S. Cl. .................................. 250/484.1; 250/337
[58] Field of Search ............................ 250/484.1, 337

[56] References Cited

U.S. PATENT DOCUMENTS

| | | | |
|---|---|---|---|
| 3,243,590 | 3/1966 | Forsman et al. | 250/484.1 |
| 3,255,120 | 6/1966 | Cohen . | |
| 3,294,700 | 12/1966 | Bedier et al. . | |
| 3,463,664 | 8/1969 | Ryosuke Yokota et al. . | |
| 3,883,748 | 5/1975 | Nada et al. | 250/484.1 |
| 3,894,234 | 7/1975 | Cox et al. | 250/484.1 |
| 3,899,679 | 8/1975 | Regulla | 250/484.1 |
| 4,179,614 | 12/1979 | Felice et al. | 250/484.1 |
| 4,303,857 | 12/1981 | Inoue et al. | 250/337 |
| 4,510,174 | 4/1985 | Holzapfel et al. | 250/484.1 |
| 4,546,259 | 10/1985 | Zendle | 250/484.1 |
| 4,636,642 | 1/1987 | Simons et al. | 250/484.1 |

OTHER PUBLICATIONS

Okamoto et al., "Thermoluminescent Sheets for the Detection of High Energy Hadronic & Electromagnetic Showers", Nucl. Instru. & Methods, A243(1), 2-1-86, pp. 219-224.
Okamoto et al., "Thermoluminescent Sheet to Detect the High Energy Electromagnetic Cascades" (Abstract Only), 18th International Cosmic Ray Conf., Bangalore India, Aug. 22, Sep. 3, 1983.
Gasiot et al., "Laser Heating in Thermoluminesce Dosimetry"; J. Appl. Phys., 53 (7), Jul. 1982, pp. 5201-5209.
J. Gasiot et al., "Laser Heating in Thermoluminesence Dosimetry," J. Appl. Phys., 53(7), Jul. 1982, p. 5200-5209.
E. Piesch, "Application of TLD to Personnel Dosimetry, " Applied Thermoluminescence Dosimetry, 1981, p. 167-195, Eds. M. Oberhofer & A. Scharmann.

Primary Examiner—Carolyn E. Fields
Attorney, Agent, or Firm—Wells, St. John & Roberts

[57] ABSTRACT

Thin layer thermoluminescent radiation dosimeters for use in laser readable dosimetry systems, and methods of fabricating such thin layer dosimeters. The thin layer thermoluminescent radiation dosimeters include a thin substrate made from glass or other inorganic materials capable of withstanding high temperatures and high heating rates. A thin layer of a thermoluminescent phoshphor material is heat bonded to the substrate using an inorganic binder such as glass. The dosimeters can be mounted in frames and cases for ease in handling. Methods of the invention include mixing a suitable phosphor composition and binder, both being in particulate or granular form. The mixture is then deposited onto a substrate such as by using mask printing techniques. The dosimeters are thereafter heated to fuse and bond the binder and phosphor to the substrate.

64 Claims, 8 Drawing Sheets

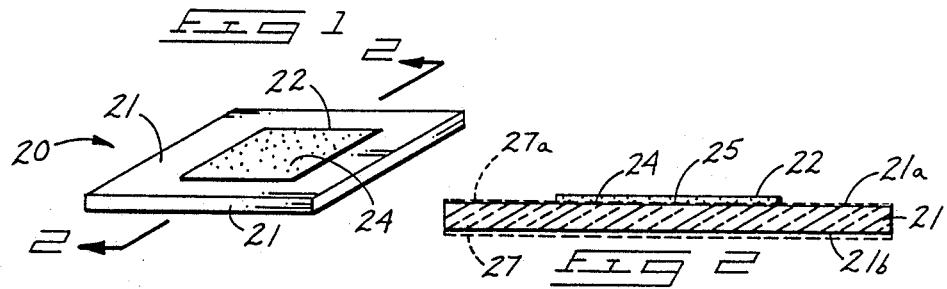
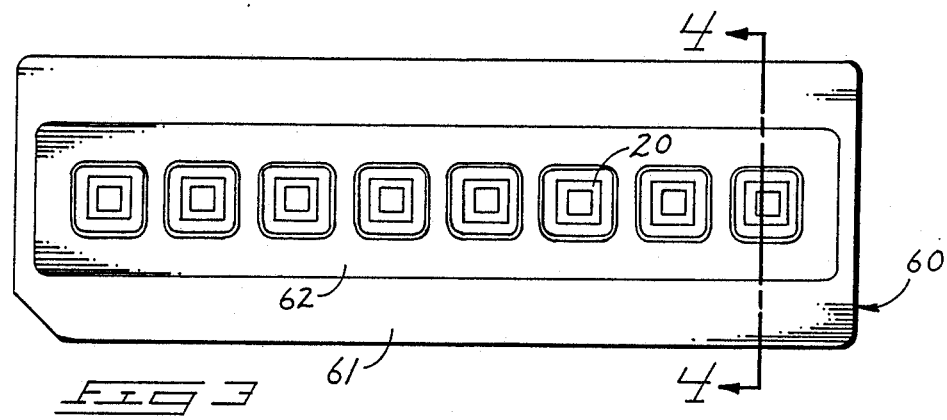
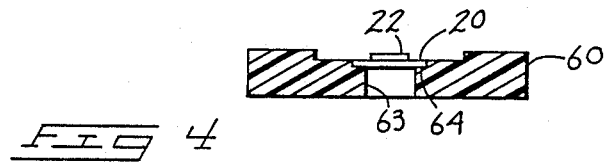
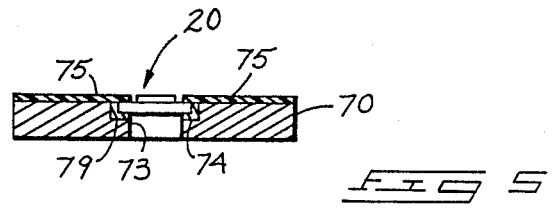
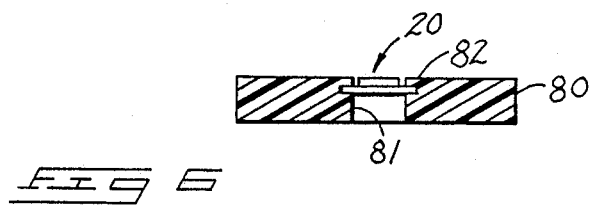

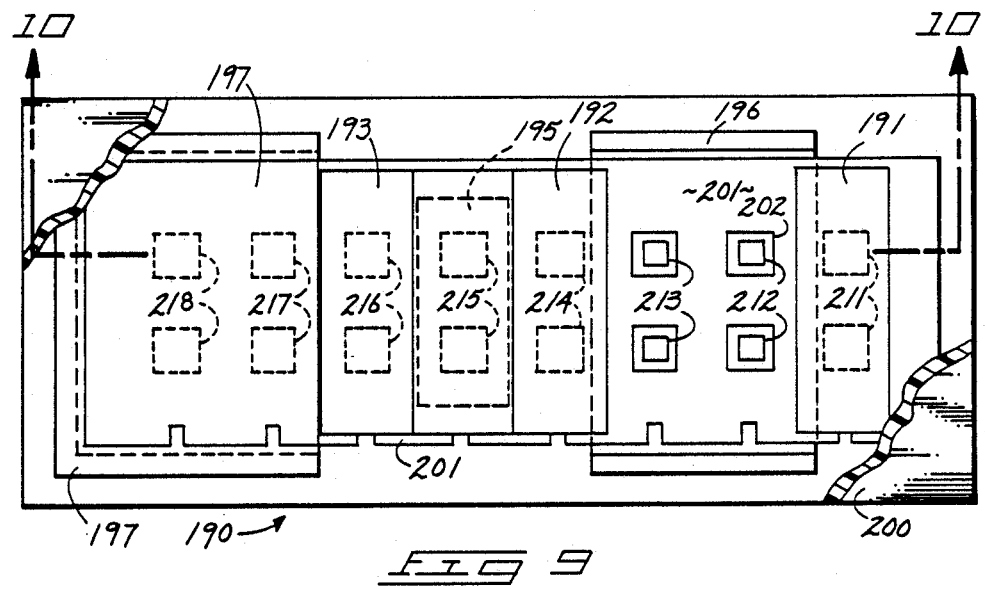
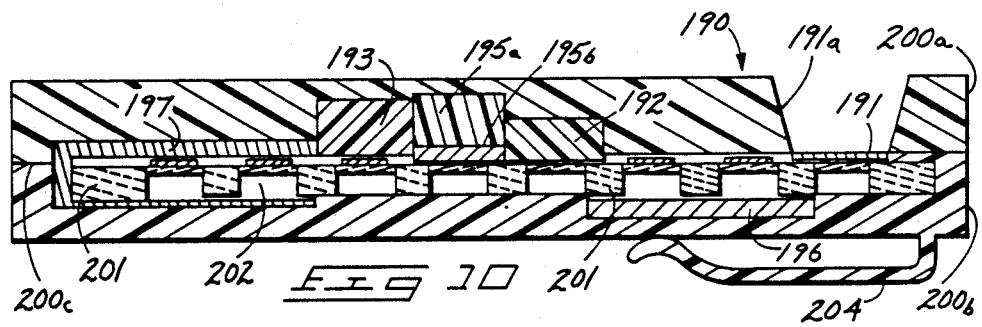

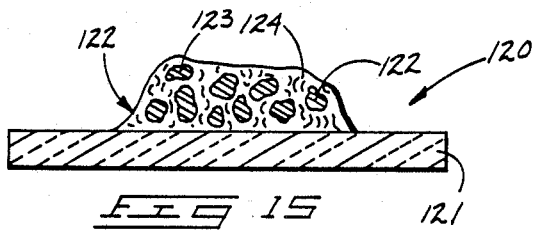
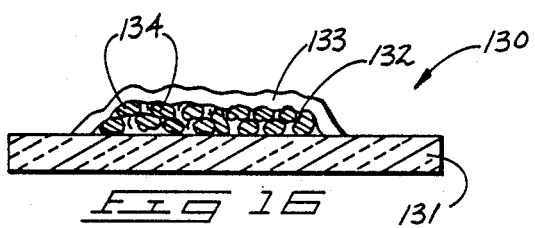
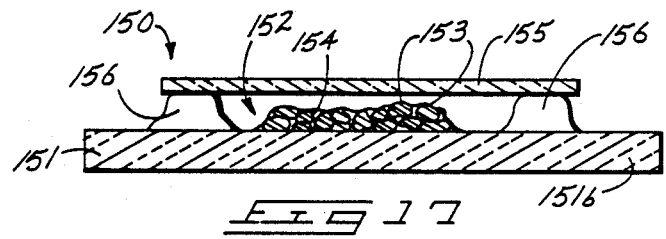
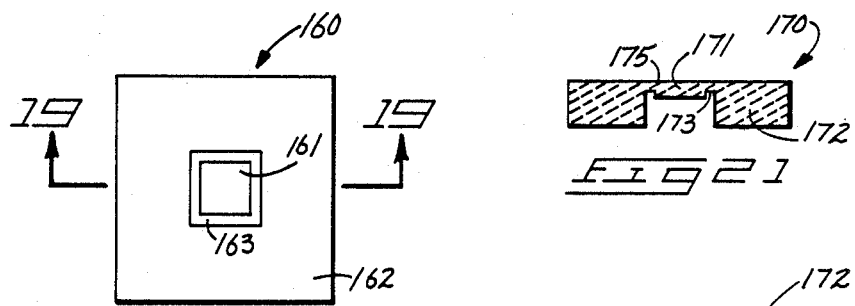
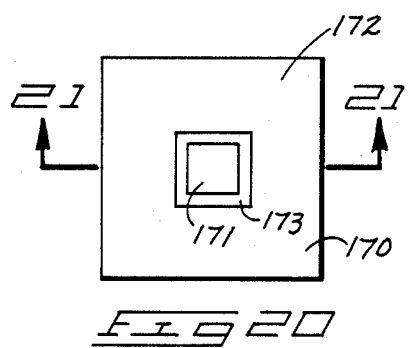

LASER READABLE THERMOLUMINESCENT RADIATION DOSIMETERS AND METHODS FOR PRODUCING THEREOF

The U.S. Government has a nonexclusive, nontransferable, irrevocable, paid-up license to practice or have practiced for or on behalf thereof, the invention described herein pursuant to Contract No. DE-AC03-84ER80165 with the U.S. Department of Energy.

TECHNICAL FIELD

The technical field of this invention relates to thermoluminescent phosphor dosimeters which can be read using laser heating techniques to determine the level of excitation which has occurred from exposure of the dosimeters to ionizing radiation. Also relevant are methods for fabricating such laser readable radiation dosimeters.

BACKGROUND OF THE INVENTION

It is well known in the art that certain materials called thermoluminescent phosphors can be irradiated with high energy radiation and then subsequently stimulated using heat, to produce a luminescent emission. Thermoluminescent phosphors are in widespread use in radiation dosimeters used to measure the amount of incident radiation to which people, animals, plants and other things are exposed. Thermoluminescent dosimeters are widely used by workers in the nuclear industries to provide a constant monitor for measuring exposure to radiation.

Thermoluminescent phosphors are excited by energetic radiation such as ultraviolet, X-ray, gamma, and other forms of radiation. Such ionizing radiation causes electrons within the thermoluminescent material to become highly energized. The nature of thermoluminescent materials causes these high energy electrons to be trapped at relatively stable higher energy levels. The electrons stay at these higher energy levels until additional energy, usually in the form of heat, is supplied which releases the trapped electrons, thereby allowing them to fall back to a lower energy state. The return of the electrons to a lower energy state causes a release of energy primarily in the form of visible light which is ordinarily termed a luminescent emission.

The use of thermoluminescent phosphors in personal dosimeters has led to demand for a large number of dosimeters which must be read on a routine basis in order to monitor exposure of persons or other objects to ionizing radiation. Because of the substantial numbers and the relatively slow reading techniques currently employed, the job of reading dosimeters becomes very time consuming and costly.

There are four commonly known methods of heating thermoluminescent material in order to release the trapped electrons and provide the luminescent emission which is measured as an indication of the amount of ionizing radiation to which the dosimeter was exposed. The first and most common method for heating thermoluminescent phosphors is by contact heating. The second method is heating using a hot gas stream which is impinged upon the phosphor. The third method uses radiant energy in the form of infrared beams which heat the luminescent phosphor. The fourth method uses infrared laser beams to provide the necessary heat for luminescent emission.

Novel methods and apparatuses for laser reading of thermoluminescent phosphor dosimeters are disclosed in detail in applicant's co-pending patent application Ser. No. 652,829, now U.S. Pat. No. 4,638,163, the subject matter of which is incorporated by reference hereinto. One of the inventors of this invention and his colleagues have developed laser reading techniques and dosimeters, as disclosed in an article entitled "Laser Heating in Thermoluminescence Dosimetry," by J. Gasiot, P. Braunlich, and J. P. Fillard, *Journal of Applied Physics*, Vol. 53, No. 4, July 1982. In that article, the authors describe how thin layers of thermoluminescent phosphors can be precipitated onto glass microscope cover slides and used as laser readable dosimeters. Powder layers of the phosphors were in some cases coated with a thin film of high temperature polymers. The content of said article is hereby incorporated hereinto by reference.

Laser heating of thermoluminescent phosphors is superior because of the greatly decreased heating times and associated increased processing rates which are possible. Release of stored luminescent energy within a short period of time greatly improves signal-to-noise ratios and thus the accuracy of dosimeter measurements.

The benefits of laser heating for luminescent phosphors has not been fully realized because of difficulties associated with laser heating of prior art dosimeters. Relatively thick layers of luminescent phosphors (1 mm) can be heated using lasers, but necessarily require longer heating times because of the larger mass of phosphor which must be heated. Higher laser power levels can theoretically be used but at higher cost. Thick layer dosimeters further suffer from problems of prolonged heating as the heat generated in the phosphor diffuses outwardly from the area of last impingement. This reduces the accuracy of the measurements. Thermal gradients developed within the phosphor layer can also lead to degradation of the phosphor layer when high power levels are used to produce high heating rates.

Thermoluminescent phosphor radiation detectors have been commercially available as crystals, hot-pressed or extruded elements, powder embedded into a Teflon matrix, phosphor particles in glass capillaries, and in thin layers upon metal or plastic foil in surface concentrations of about 20 milligrams per square centimeter, E. Piesch, "Application of TLD to Personal Dosimetry," *Applied Thermoluminescence Dosimetry*, Editors M. Oberhofer and A. Scharmann, 1981, which is hereby incorporated hereinto by reference. The Piesch article also states that ultra-thin bonded discs of lithium fluoride (LiF) in a Teflon matrix have been bonded to thick Teflon bases. The article further states that such dosimeters use approximately 6 milligrams of phosphor per square centimeter. Such dosimeters are unfortunately also light sensitive and produce their own luminescent output. They are unable to withstand the approximately 400° C. or higher temperatures which must be used to deep anneal dosimeters after many prior exposures and read cycles. Many other plastic and organic material based dosimeter configurations also suffer from these problems of temperature and light stimulated luminescent output. Plastic substrate and/or matrix dosimeters also are unacceptable for laser heating because of the localized high temperatures developed at the point of laser impingement which lead to degradation of the plastic. Other organic materials also suffer from these limitations.

U.S. Pat. No. 4,510,174 to Holzapfel et al discloses a method for manufacturing thin layer dosimeters. The method involves hot-pressing a thermoluminescent phosphor deposited on a substrate. The substrate must have a suitably prepared surface. The hot-pressing causes plastic flow of the phosphor to occur, bonding the phosphor to the substrate. The Holzapfel invention is disadvantageous in that it does not work well, if at all, with $CaSO_4$, BeO, and $Al_2O_3$ because these materials are hard and not subject to easy plastic flow at reasonable temperatures and pressures. The Holzapfel invention also is disadvantageous because the thickness of phosphor that must be heated is greater than what is required. The substrates used by Holzapfel are god for contact heating but are not good in laser heating because of their high conductivity. Thermal expansion rate mismatch is also a potential problem with laser heating of the Holzapfel dosimeters.

U.S. Pat. No. 3,894,238 to Cox et al teaches a laminated dosimetric card including thermoluminescent dosimeters sealed in an envelope of polyolefin, fluorinated ethylene propylene polymers, or PTFE. The dosimeters use a crystal or chip of phosphor or a quantity of powder. Such dosimeters cannot be deep annealed or heated using a laser reading apparatus, because of temperature limitations as explained above.

A manganese activated phosphate glass useful in radiation dosimetry is taught in U.S. Pat. No. 3,899,679 to Regulla. Regulla uses a phosphate glass which is doped with manganese in concentratios from 0.1% to in excess of 10%, along with dysprosium. Addition dopants disclosed by Regulla include cerium and silver. U.S. Pat. Nos. 3,294,700 to Bedier et al, and 3,463,664 to Yokota et al disclose other phosphate glasses useful as dosimeters. U.S. Pat. No. 3,255,120 to Cohen teaches a further thermoluminescent glass.

It is an object of this invention to provide thin layer thermoluminescent radiation dosimeters which can be very rapidly read using laser beams in a manner that allows reliable measurment of the resulting luminescent emissions.

It is another object of this invention to provide methods by which a laser readable thin layer of thermoluminescent radiation dosimeter can be fabricated.

These and other objects and advantages of this invention will be apparent from the description given herein.

BRIEF DESCRIPTION OF THE DRAWINGS

Preferred embodiments according to the invention are illustrated in the accompanying drawings, in which:

FIG. 1 is a perspective view of a preferred dosimeter according to this invention;

FIG. 2 is an enlarged side cross-sectional view of the dosimeter of FIG. 1;

FIG. 3 is a plan view of an alternative embodiment dosimeter of this invention having a frame and a plurality of individual dosimeter inserts;

FIG. 4 is a cross-sectional view taken along line 4—4 of FIG. 3;

FIG. 5 is an alternative cross-sectional configuration similar to FIG. 4;

FIG. 6 is another alternative cross-sectional configuration similar to FIG. 4;

FIG. 9 is a top or plan view of another dosimeter of this invention having a case, filters and a means for attaching the dosimeter; portions of the case have been broken away to better show underlying components;

FIG. 10 is a sectional view of the dosimeter of FIG. 9 taken along line 10—10;

FIG. 15 shows a cross-sectional view of a dosimeter having a protective and moisture resistant construction according to this invention;

FIG. 16 shows a cross-sectional view of an alternative dosimeter having moisture and gas resistance;

FIG. 17 shows a cross-sectional view of a still further alternative dosimeter having a cover piece protecting the phosphor matrix layer of the dosimeter;

FIG. 18 is a plan view of a still further embodiment dosimeter having a thermal insulation ring;

FIG. 19 is a cross-sectional view taken along line 19—19 of FIG. 18;

FIG. 20 is a plan view of a blank used to produce dosimeters such as shown in FIGS. 18 and 19;

FIG. 21 is a cross-sectional view taken along line 21—21 of FIG. 20;

DETAILED DESCRIPTION OF THE PREFERRED EMBODIMENTS

Figure 7:
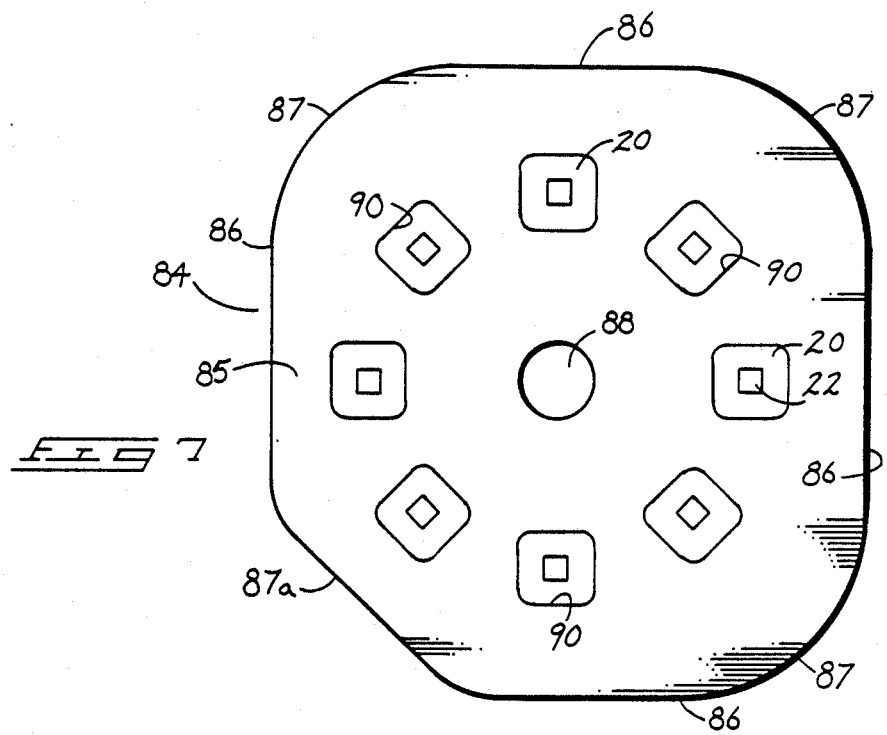
FIG. 7 is a plan view of another dosimeter of this invention having a frame.

In compliance with the constitutional purpose of the Patent Laws "to promote the progress of science and useful arts" (Article 1, Section 8), applicant submits the following disclosure of the invention.

FIG. 1 shows a preferred dosimeter 20 according to this invention. Dosimeter 20 includes a substrate 21 and a phosphor-matrix layer 22 connected to the substrate. FIG. 2 illustrates that phosphor-matrix layer 22 comprises particles or granules 24 and an interconnecting binder 25. The interconnecting binder or matrix 25 is bonded to substrate 21 and holds phosphor particles 24 is position thereon. Binder matrix 25 also typically forms bonds with the thermoluminescent phosphor particles thereby providing a solid, two-part layer bonded to substrate 21.

Substrate 21 can be made from a variety of materials. Transparent glasses have been found most preferable. An example of a preferred type of glass of Corning Type 0211 which is a potash, soda, zinc, titania, alkalizinc borosilicate glass, Corning Glass Works, Corning, N.Y. 14830. Type 0211 has a softening point of 720° C. (1328° F.) at $10^{7.6}$ poises and a coefficient of thermal expansion equal to $73.8 \times 10^{-7}$/°C. Glasses or other materials containing heavy metals such as lead may not be desirable because of attenuation of the radiation being measured. In high energy applications such materials may be insignificant or even desired because of their ability to attenuate radiation. Other additives or substrate types having similar properties may accordingly be avoided or desired.

A transparent substrate material such as glass allows the level of thermoluminescent emissions to be read either from the phosphor side 21a of substrate 21 or from the back side 21b. Substrate 21 can be provided with an optional luminescent emission reflective coating 27 (shown in phantom on back side 21b) to reflect thermoluminescent emission out through phosphor side 21a for more complete detection of the level of thermoluminescent energy released. A similar metallic or other reflective coating 27a can also be used between phosphor-matrix layer 22 and substrate 21.

Other suitable substrate materials include beryllium oxide (BeO), other tissue-equivalent ceramics, aluminum oxide ceramic, hot-pressed lithium fluoride ceramic, boron nitride, carbon, and aluminum. Aluminum compositions are not the most preferred substrate materials because of relatively high thermal conductivity and relatively high coefficients of thermal expansion and some deviation from strict tissue equivalency. In general the substrate material should be chosen to have a coefficient of thermal expansion which lies within approximately one order of magnitude when compared to the coefficient of thermal expansion of matrix 25 or the composite phosphor-matrix layer 22. Thermal expansion rates for the substrate and phosphor matrix layer within such a range will in most combinations prevent thermal cracking and disintegration, although specific combinations of particular substrates and phosphor-matrix materials may experience relatively greater or less susceptibility to thermal expansion rate failures. In most applications a factor of two is most preferred as indicating the amount of thermal mismatch which is typically acceptable to prevent thermal cracking and disintegration.

Substrate 21 is preferably made relatively thin. In the case of Type 0211 glass, thicknesses lying in the range of 0.002-0.040 inch (50-1000 micrometers) are preferred. Substrate 21 is preferably made thin to minimize the amount of material adjacent phosphor-matrix layer 22 which must be heated as a necessary concomitant to heating of phosphor particles 24. Glasses are preferred in this regard because of their relatively low thermal conductivities which reduce the amount of laser energy which must be used.

The present invention includes the discovery that a thin glass substrate can be used to achieve accurate and reliable dosimeter measurements even though glass is considered a non-tissue-equivalent material. The suitability of properly selected glass substrates is further enhanced when a surrounding frame supporting dosimeter 20 is made from tissue-equivalent materials. The usefulness of glass is very important since glass substrates are easily processed, inexpensive, and capable of withstanding the very high (up to approximately 4000° C./cm) thermal gradients occurring during laser heating.

The binder or matrix material 25 is preferably a heat fusible inorganic binder material capable of withstanding the high thermal gradients and approximately 400° C. or higher temperatures experienced during laser reading of dosimeters. Suitable binder materials are Display Sealing Glasses 7555 and 7556 manufactured by Corning Glass Works of Corning, N.Y. Sealing Glass 7555 is a vitreous sealing glass having a softening point of 415° C. and a sealing temperature of 450° C. The coefficient of thermal expansion is $90 \times 10^{-7}$in./in./°C., for the range 25°-300° C. Type 7556 is a similar glass having a lower coefficient of thermal expansion and a lower softening point. Types 7555 and 7556 are not tissue-equivalent glasses but exhibit radiation attenuation properties which are not substantial enough to prevent acceptable results in most cases.

Binder materials are most preferably chosen to be tissue-equivalent or nearly tissue equivalent unless attenuation of higher energy radiation exposure is desired. A suitable glass which is nearly tissue equivalent is currently designated as Corning Experimental Glass 869AVW. The composition of Type 869AVW is as follows: $SiO_2$ - 51%; $Al_2O_3$ - 12.5%; $B_2O_3$ - 25%; $Li_2O$ - 6%; $Na_2O$ - 5.5%. Type 869 AVW exhibits a softening point of 602° C. and a coefficient of thermal expansion of $7.2 \times 10^{-6}$/°C.

Other inorganic binder materials exhibiting the ability to fuse and bond phosphor particles to a desired substrate are also within the scope of this invention. The softening temperatures of the glass or other inorganic binder should be less than the softening temperature of the substrate. This assures that it is sufficiently low so that the heat-fusing processing temperature of the dosimeter does not exceed the temperature capability of the substrate and phosphor particles used.

The phosphor composition particles 24 can be made from a single type or mixtures of thermoluminescent phosphors well known in the art. Examples of acceptable phosphors include: lithium fluoride (LiF); lithium borate ($Li_2B_4O_7$); calcium sulfate ($CaSO_4$); calcium fluoride ($CaF_2$); magnesium borate ($MgB_4O_7$); beryllium oxide (BeO); and aluminum oxide ($Al_2O_3$). These or other phosphors are appropriately doped with dysprosium (Dy), thulium (Tm), manganese (Mn), samarium (Sm), copper (Cu), Silver (Ag), titanium (Ti), and magnesium (Mg) or other dopants in order to give the desired thermoluminescent properties as is well known in the art. The specific application of the dosimeter will in many cases suggest preferred types of phosphors. The following Table 1 shows some known operable phosphors useful in this invention. Many others will undoubtedly be useful.

TABLE I

| Phosphor | Dopant |
|---|---|
| Aluminum oxide | none - naturally thermoluminescent |
| Beryllium oxide | none - naturally thermoluminescent |
| Lithium fluoride | none - naturally thermoluminescent |
| Lithium fluoride | Ti, Mg |
| Lithium borate | Mn, Cu |
| Magnesium borate | Dy, Tm |
| Calcium sulfate | Mn, Dy, Tm, Sm |
| Calcium fluoride | Mn, Dy |

The phosphor composition particles 24 should be appropriately sized and configured to provide the effectiveness desired for thin layer dosimeters according to this invention. If the particle size is too small the thermoluminescent energy storage and emission capabilities of the phosphor are diminished. If the grain sizes are too large the layer is not sufficiently uniform and is difficult to bind to substrate 21 using binder matrix 25. Surface densities of 1–30 milligrams per square centimeter have been found preferable. Phosphor grain or particle sizes are advantageously less than 100 microns in size, more preferably in the range of 1–100 microns, even more preferably 10–60 microns.

Phosphor composition particles 24 can be made exclusively of thermoluminescent phosphor materials as taught above, or alternatively, such materials can be mixed or extended with other suitable material for purposes of bonding, processing or other desired property or properties sought in addition to the thermoluminescent effect. One such additive is boron nitride which is tissue-equivalent and can be added to improve thermal conductivity. Various isotopes of lithium and boron are also potentially of value as additives or blends with phosphors.

One or more dosimeters 20 can advantageously be mounted in a supporting frame such as shown in FIGS. 3, 4, 5, and 6. FIGS. 3 and 4 show a frame 60 having a plurality of apertures 63 formed therethrough. Apertures 63 each have associated ledges 64 formed therein for receiving and supporting dosimeters such as dosimeter 20 therein. Dosimeters 20 can advantageously be mounted in frame 60 using a suitable adhesive.

Frame 60 can be constructed using a variety of materials. Radiation dosimetry has previously recognized the desirability of using dosimeters which have radiation absorption properties which are equivalent to the human skin or other organisms or objects for which radiation measurements are being measured. This is often termed "tissue equivalency" and it is often an important consideration in dosimeter systems. In most situations it is desirable to construct frame 60 and similar frames and cases for the dosimeters of this invention from tissue-equivalent matrials. There are a number of materials considered tissue equivalent which are useful for this purpose. A number of plastics such as polyethylene and PTFE are accepted as sufficiently tissue-equivalent and the frame 60 of FIG. 4 is shown constructed of such tissue-equivalent polymers. Alternative materials having sufficient tissue-equivalency for use as preferred frames include aluminum (Al) and beryllium oxide (BeO). Others will clearly be possible.

FIG. 5 shows an alternative frame 70. Frame 70 is made from aluminum or other suitable material having a substantial degree of tissue equivalency. Because of the thermal expansion experienced by substrate 21 of dosimeter 20 during lasere heating it is preferable not to adhere or tightly bind the substrate to frame 70. Dosimeter insert 20 is secured to the aluminum by positioning within an aperture 73 having a ledge 74 similar to ledges 64. A high temperature plastic or elastomeric insert or ring 79 can be interposed between the dosimeter 20 and frame 70 to allow for easier mounting, thermal isolation, and to accommodate thermal expansion. dosimeter insert 20 is positioned upon ledge 74 within insert 79 and further secured in place using a laser of high temperature plastic 75. Plastic layer 75 can be KAPTON or TEFLON films available from DuPont. Film 75 is adhered to frame 70 using a silicone or other adhesives well known in the art.

FIG. 6 shows a still further alternative substrate holder or mounting structure 80 similar to frames 60 and 70 described above. Frame 80 is distinctive in that dosimeter insert 20 is mounted within aperture 81 by thermally forming a retaining flange 82 upon the upper side of substrate 21 thereby capturing dosimeter insert 20 within frame 80.

Figure 14A:
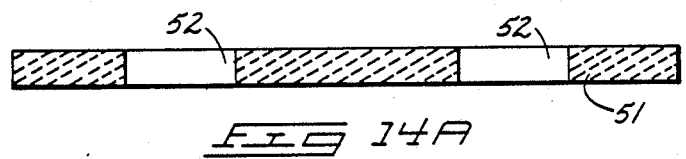
FIGS. 14A-14D illustrate a method for mounting dosimeter inserts to frames according to this invention.
Figure 14B:
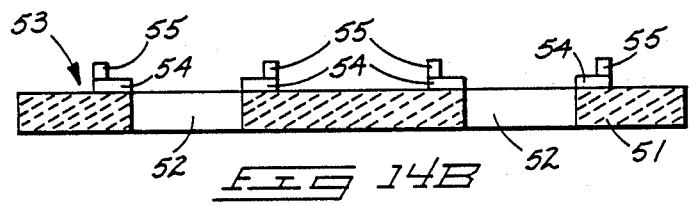
Figure 14C:
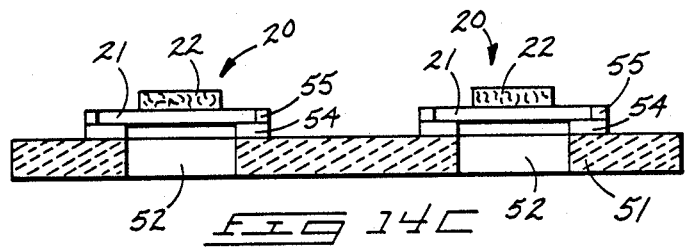
Figure 14D:
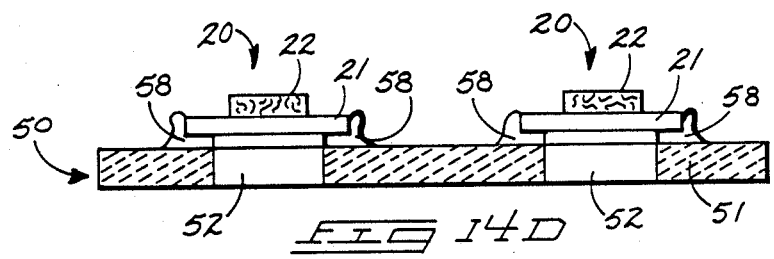

FIG. 14D shows a further alternative construction for mounting dosimeter inserts 20 onto a frame 51. Frame 51 is constructed of BeO and is provided with two apertures 52 extending therethrough. A weld of sealing glass 58 is formed around at least portions of substrate 21 to bond the substrate in place adjacent to aperture 52. Further explanation of the method used to join substrate 21 and frame 51 will be given below.

Other alternative means for mounting dosimeters to suitable frames will be apparent to those of skill in the art from the teachings given herein.

FIG. 7 shows a further dosimeter 84 according to this invention. Dosimeter 84 includes a frame 85 and a plurality of dosimeter inserts 20. Frame 85 includes an outer perimeter having approximately square side portions 86 and arounded corner portions 87. One corner of the perimeter is formed into an angled corner 87a which serves to positively identify the orientation of frame 85 when read in automated laser dosimeter reading machinery.

Frame 85 further is provided with a center pivot aperture 88 about which frame 85 can be pivoted. Frame 85 can be pivoted to position individual dosimeters 20 which are appropriately mounted within apertures 90. Apertures 90 are arranged about pivot apertures 88 at approximately equal angular positions and at approximately equal radii from the pivotal axis defined by circular pivot aperture 88.

Figure 8:
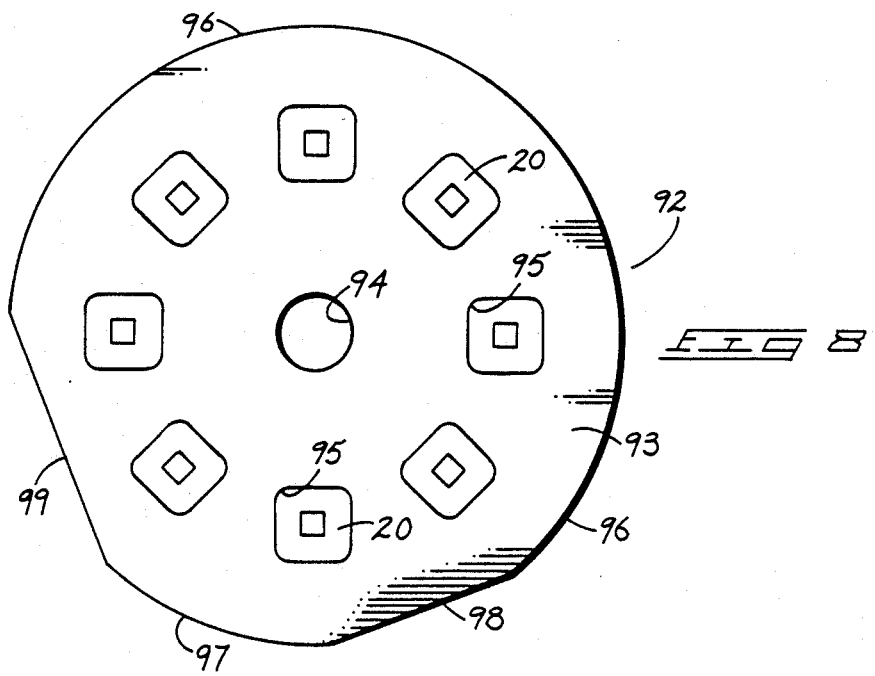
FIG. 8 is a plan view of still another dosimeter according to this invention.

FIG. 8 shows an alternative dosimeter structure 92 conceptually similar to that shown in FIG. 7. Dosimeter 92 includes a frame 93 having a central pivot aperture 94 and a plurality of dosimeter apertures 95. Dosimeter inserts 20 or their equivalent are mounted within apertures 95. Apertures 94 and 95 are arranged similar to apertures 88 and 90 described above.

The outer perimeter of frame 93 includes a large circular portion 96 and a small circular portion 97. A small flat 98 and a large flat 99 are formed along the outer perimeter of frame 93. Flats 98 and 99 serve to identify the angular position of the dosimeter in automated reading equipment (not shown). The use of differently sized flats 98 and 99 prevents inadvertent upside down placement of dosimeter 92 within such reading equipment (not shown).

FIGS. 9 and 10 show a dosimeter 190 having a case 200 and a dosimeter frame 201. Dosimeter frame 201 has a plurality of dosimeter elements 211–218 arranged in two parallel rows of eight inserts. Other arrangements are clearly possible such as explained herein. The dosimeter elements are individually numbered 211–218 to designate the type of phosphor insert used. Two rows are provided so that there are pairs of dosimeter elements for redundant measurements or for statistical accuracy when relatively long storage times are experienced. The dosimeter frame 201 is provided with apertures 202 which are used to mount inserts 211–218 in a suitable manner as described elsewhere in this specification.

Case 200 is advantageously made in two parts 200a and 200b which are divided along a lateral part line 200c. Case parts 200a and 200b can be held together with fasteners (not shown), interengaging parts (not shown), adhesives or otherwise as is well known in the art. Case 200 is further provided with a clip 204 which can be used to hold the dosimeter on a shirt or suit pocket. Other means for attaching the case to people, clothing or other objects are clearly possible.

Case 200 is advantageously adapted to carry a plurality of radiation filters or reflectors for selectively passing, filtering and/or reflecting particular radiation types or to attenuate radiation generally. FIGS. 9 and 10 show relatively thin filters 191 mounted on the front side of dosimeter inserts 211 within recesses 191a. Recesses 191a reduce the radiation attenuation effect caused by the case material itself. Such recesses or apertures can be used in other applications to accurately adjust the filtering used with particular dosimeter inserts. Filters 191 can advantageously be made from a material exhibiting radiation affecting properties which are tissue-equivalent. Filters 191 can be appropriately provided with a surface density of approximately 7 mg/cm$^2$ of such material to simulate the radiation dose received by the skin, particularly with regard to beta and gamma radiation. Case 200 also advantageously mounts a filter 192 over inserts 214. Filter 192 can be made with a surface density of 300 mg/cm$^2$ of tissue-equivalent material to simulate the dose received by the human eye.

A deep dose filter 193 can further be mounted in case 200. Filter 193 is advantageously made with a surface density of 1000 mg/cm$^2$ from a tissue-equivalent material. Filter 193 will effectively limit exposure of phosphor layers 216 to low energy radiation.

A further filter 195 is used to discriminate fast neutron dose. Filter 195 includes a first part 195a which is the same as filter 193. A second part 195b is a proton radiator which generates protons from collisions with fast neutrons. The protons produce measurable thermoluminescent energy storage which indicates fast neutron dose. The gamma radiation background level from phosphor inserts 216 is subtracted from the measured amount of inserts 215 to selectively measure fast neutrons.

A still further filter 197 is used to cover inserts 217 and 218. Filter 197 covers both sides of such inserts. The front side advantageously uses a 50 mil (1.3 mm) thick cadmium or boron filter whereas the back side can use a 15 mil (0.4 mm) thick layer of the same or similar material. The phosphor layers 217 and 218 are advantageously TLD-600 and TLD-700, respectively. TLD-600 and TLD-700 are lithium fluoride made with different isotopes of lithium. Lithium-6 is thermal neutron sensitive whereas Lithium-7 is not. The difference in sensitivity allows assessment of the thermal neutron exposure. Other phosphors such as lithium borate made using the same distinctive isptopes of lithium produce a similar configuration. It is also possible to add different isotopes of lithium or boron (boron-10 and boron-11) as an admixture to other phosphors, such as calcium sulfate to produce two dosimeter elements having different sensitivity to thermal neutrons or other radiation forms. This configuration produces an albedo effect with the front filter shielding against incident thermal neutrons.

Incident thermal neutrons are identified using TLD-600 and TLD-700 phosphors for spots 212 and 213. A 50 mil (1.3 mm) or thicker cadmium or boron filter 196 behind these spots shields against albedo (backscattered) neutrons.

Filters 191-193, and 195-197 are advantageously mounted to case parts 200a and 200b using adhesives or other suitable means. A variety of additional filter types can alternatively or additionally be used as required by the specific application to which a dosimeter is being put.

Figure 27:
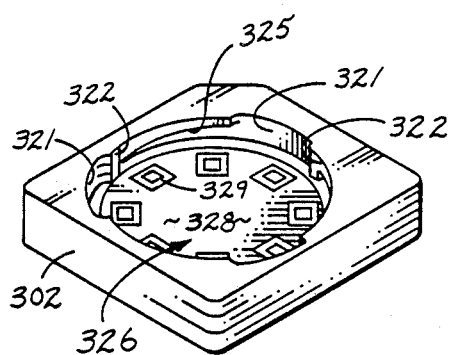
FIG. 27 is a perspective view of a casing adapted to receive the dosimeter of FIG. 26; please note that the dosimeter of FIG. 26 is flipped over prior to installation into the casing of FIG. 27.
Figure 28:
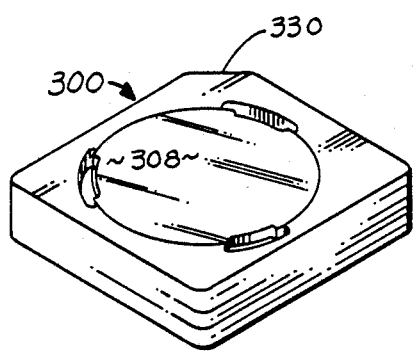
FIG. 28 is a perspective view similar to FIG. 27 with the dosimeter of FIG. 26 installed therein.
Figure 29:
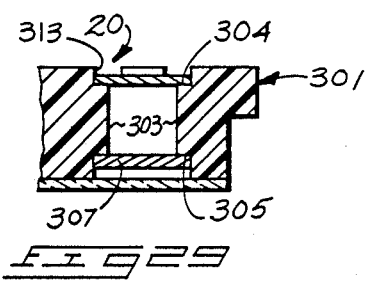
FIG. 29 is a partial sectional view taken at line 29—29 of FIG. 26.

FIGS. 26-29 show an alternative case configuration useful in dosimeters according to this invention. Case 300 includes a disk 301 and a mounting casing 302. Disk 301 is provided with a plurality of apertures 303 which extend through disk 301 and are provided with top and bottom ledges 304 and 305, respectively. Note that FIGS. 27 and 28 are upside down with respect to FIGS. 26 and 29. Top ledges 304 are used to adhesively mount dosimeter inserts 20. Bottom ledges 305 are used to adhesively mount back filters 307, if desired. Disk apertures 303 are preferably provided with projections 313 spaced from ledges 304 and 305 so that the inserts or filters can be snapped into place in a mechanical interengagement with the dosimeter frame. The entire back of disk 301 can be covered with a transparent face 308 made from plastic or glass. Alternatively, the back can be left uncovered.

Disk 301 is provided with a series of bayonet mounting projections 310 spaced angularly about the disk, for being received in mating reception channels 321 formed in casing 302. Stops 322 are provided in casing 302 to limit angular travel of disk 301 in channels 321. Channels 321 have sloping surfaces 325 which draw the disk into receptacle 326. Casing 302 is advantageously provided with a front wall 328 which is used to mount individual front filter 329. Casing 302 is also advantageously provided with one clipped or identifiable corner 330 to simplify mounting.

Preferred methods for producing the thin layer laser readable dosimeters according to this invention will now be further described. The methods involve selecting at least one suitable thermoluminescent phosphor. A variety of thermoluminescent phosphors can be used as indicated above. The phosphors must be purchased or made into granules or particles having a particle size approximately equal to or less than the desired thickness of the phosphor matrix layer which is to be produced. Particle sizes in the ranges indicated hereinabove are preferred.

It may be desirable in certain instances to combine the thermoluminescent powder with additives or relatively inert materials for purposes of manufacture or otherwise. Inclusion of such additives or extenders in a thermoluminescent phosphor composition is clearly within the scope of this invention.

The thermoluminescent phosphor compositions are advantageously intermixed with at least one type of granular or powdered inorganic binder material. Preferred types of binder materials are the sealing glass binder and other equivalent materials taught or described herein. The binder materials are ground or otherwise provided in or prepared to grain sizes which are preferably smaller than the general or average grain sizes of thermoluminescent phosphors being intermixed therewith. The softening temperature of the inorganic or glass binder materials must be less than the melting or decomposition temperature of the substrate with which the binder materials will be used.

The phosphor composition and inorganic binder materials can be mixed in a variety of proportions. A ratio of 4:1 thermoluminescent phosphor to sealing glass binder has been found preferable. Ratios varying from 10:1 to 1:2 are believed useful depending upon the type of materials used, the grain sizes and the type of substrate onto which the materials will be applied.

The selected thermoluminescent phosphor composition and binder material are advantageously intermixed to produce a substantially homogenous phosphor-binder mixture. Initial mixing of the powdered ingredients is preferably done in a dry state. The powdered ingredients can also be initially mixed or additionally mixed in the presence of some further agent, such as a printing vehicle as explained more fully hereinafter.

The method further involves selecting an appropriate substrate. Suitable substrate materials and thicknesses are described hereinabove. The surface of the substrate receiving the phosphor-matrix layer should be suitably cleaned. Depending on the type of binder and substrate materials chosen it may be desirable to select a particular range of surface textures for improved bonding. The substrate can also be coated with any suitable coating for either bonding or radiation affecting purposes.

The method further involves depositing the phosphor-binder mixture onto the selected substrate. Deposition of the mixture onto the substrate is preferably done using the following procedure.

The phosphor-binder mixture is advantageously mixed with a suitable printing vehicle or other liquid substance serving an equivalent function. The vehicle used must leave only a very small amount of residue when dry, preferably less than 1% of the vehicle. The vehicle must also be capable of forming a paste or liquid having a viscosity which allows the phosphor-binder-vehicle mixture to be applied to the substrate in a layer having approximately uniform thickness. One class of vehicles found acceptable for use in this invention are made from ethylcellulose dissolved in a high temperature solvent. One suitable solvent for such vehicles is pine oil. Other solvent and polymer combinations may also be acceptable. Vehicles typically have additives which help to control properties such as viscosity, homogeneity, thixotropy and drying characteristics. The specific solvent used also will necessarily affect such properties of the vehicle. The current invention requires a vehicle which can be mixed with glass frit or other binder composition and also be acceptable for use with the particular phosphor composition being used. A preferred vehicle is type 400 available from Electro-Science Laboratories of King of Prussia, Pa. Other useful vehicles include types 403, 406, 414, 416, 417 and 424, also from Electro-Science Laboratories. Those skilled in the art will recongize a variety of suitable printing vehicles or similar functioning compounds for mixture with the phosphor and binder compositions.

Figure 11A:
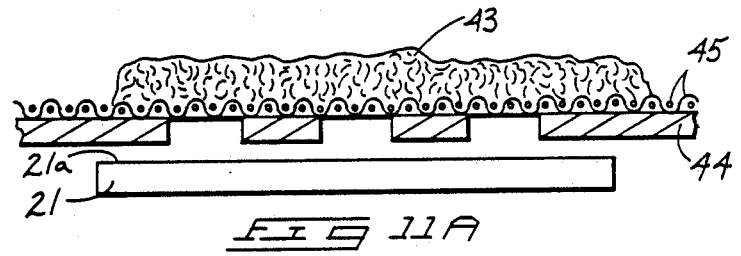
FIGS. 11A-11C are cross-sectional views illustrating a method for producing dosimeters according to this invention.
Figure 11B:
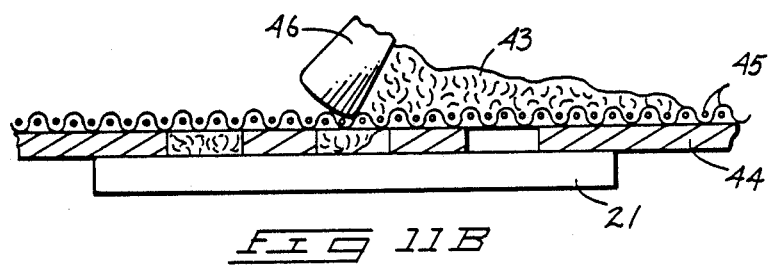
Figure 11C:
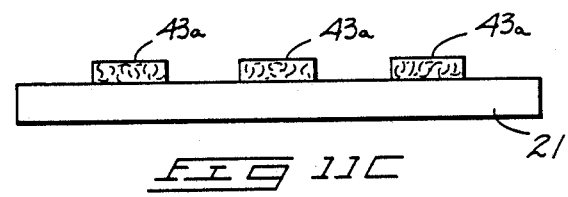

A resulting phosphor-binder-vehicle mixture is preferably applied to the substrate using a printing process such as illustrated in FIGS. 11A-11C. The phosphor-binder-vehicle paste 43 is advantageously placed upon a screen 45. A mask 44 is positioned between screen 45 and the substrate phosphor surface 21a. A brush 46 or other utensil is used to force the viscous paste through screen 45, particularly where mask 44 has openings 44a formed therethrough as shown in FIG. 11B. The applied layers 43a shown in FIG. 11C adhere to the substrate surface due to the properties of the printing vehicle. The mask, screen and remaining paste are moved from the substrate leaving one or more relatively uniform layers 43a thereon. FIGS. 11A-13 show the layers with exaggerated vertical dimension.

The phosphor-binder-vehicle mixture can also be deposited by mechanically applying the mixture to desired locations on a substrate using an appropriately sized spreading tool. Unwanted deposits can be removed to form desired shapes and sizes for the deposits of such mixture. Spray systems, mechanical extrusion equipment or other types of equipment may alternatively provide means for integrated or discrete deposition of the constituents or combined phosphor-binder-vehicle mixture.

The applied phosphor-binder-vehicle layers 43a are preferably left to dry at approximately 100° C. for a suitable period of time, such as 1-3 hours, to allow the solvent contained in the vehicle to volatilize. The substrate and applied phosphor-binder-vehicle layers 43a are then heated to a sufficient temperature to volatilize and pyrolyze the remaining vehicle and reduce the vehicle residue to an acceptably low level. The temperature used to remove the vehicle is herein termed the burnoff temperature and is advantageously about 400° C. when the type 400 printing vehicle and type 7555 sealing glass binder is used. The burnoff temperature should be less than the softening temperature of the binder material to assure that the vehicle is fully removed before the binder is fused.

After the vehicle has been adequately burned off, the substrate and remaining phosphor-binder spots 43b (FIG. 12) are raised to a temperature at or above the softening temperature of the binder. This heating step above the softening temperature causes the inorganic binder particles to soften, fuse and bond to the substrate. The softened binder also tends to bond to the particles of phosphor 24 thus achieving a phosphor-binder matrix which is bonded to the substrate. The dosimeters being made should be held at a temperature somewhat above the softening temperature for a sufficient period of time to allow the fusing and bonding to occur. The heating and cooling of substrate 21 and applied phosphor-binder layers 43 should be done at rates which do not cause thermal shock to occur.

It is alternatively possible to deposit the phosphor and binder in two or more separate and distinct deposition steps. One advantageous method involves mixing the binder with a suitable vehicle and depositing the resulting binder-vehicle mixture onto the substrate. Deposition can occur using the printing technique described above or using other suitable techniques. After the binder-vehicle mixture has been deposited, a suitable thermoluminescent phosphor composition is applied to the undried binder-vehicle mixture. Excess phosphor composition which does not adhere to the binder-vehicle mixture is then advantageously removed, such as by shaking, vacuum or other removal process.

Figure 22:
FIGS. 22 and 23 are side sectional views of an alternative dosimeter produced using an alternative method of the invention.

FIG. 22 shows a dosimeter 220 having a substrate 221 upon which has been applied a layer of binder-vehicle mixture 222. Phosphor composition particles 223 have been deposited upon the binder-vehicle mixture layer 222 and adhered thereto. Excess unadhered particles have been removed. After these procedures the resulting binder-vehicle phosphor are allowed to dry to remove remaining solvent from the vehicle.

Figure 23:
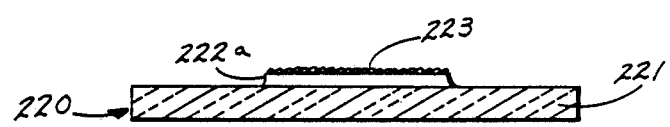

FIG. 23 shows dosimeter 220 after the binder-vehicle mixture has dried and the dosimeter has been heated to or above the softening temperature of the binder composition. The binder layer 222a has fused and bonded to both the substrate 221 and the phosphor composition particles 223 using a procedure substantially similar to that described elsewhere herein. The dosimeter construction just explained has been found very tolerant of thermal mismatch between the substrate and phosphor material. Lithium fluoride has been found particularly well handled using such novel methods and structures according to this invention.

Figure 24:
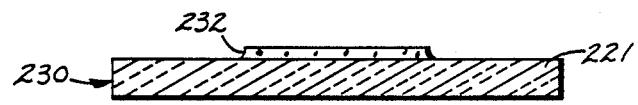
FIGS. 24 and 25 are sectional views of a still further alternative dosimeter produced using a still further alternative method of the invention.
Figure 25:
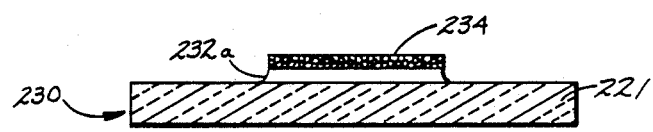
Figure 26:
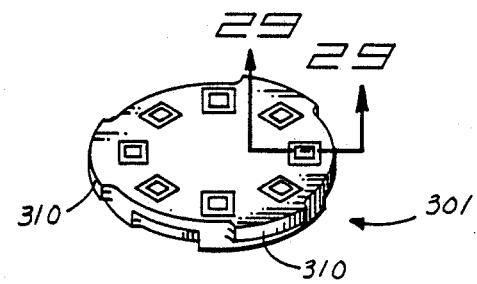
FIG. 26 is a perspective view of an alternative dosimeter of this invention.

Another method and dosimeter construction of this invention is illustrated by FIGS. 24 and 25. FIG. 24 shows a substrate 230 with an applied layer of binder-vehicle mixture 232 applied thereto. The substrate and vehicle binder mixture are then dried and heated to fuse and bond the binder to the substrate. FIG. 25 shows an additional vehicle-phosphor layer 234 deposited upon the fused and bonded layer 232 of binder. Layer 234 is then dried and heated to above the softening temperature of the binder to bond the phosphor particles of layer 234 to binder layer 232a. Addition layers can be overprinted using a protective material, such as the binder glass, as will be explained more fully below.

Figure 12:
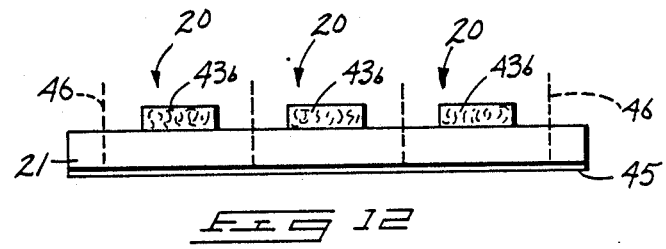
FIGS. 12 and 13 show further processing of the dosimeters made in FIGS. 11A-11C.
Figure 13:
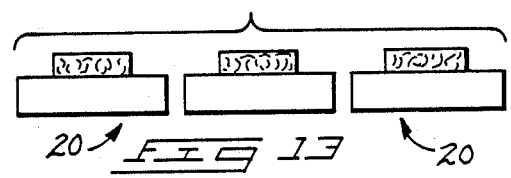

After the binder has softened, fused, bonded and cooled it is possible to divide the substrate into individual dosimeters or dosimeter inserts. FIGS. 12 and 13 illustrate that the substrate 21 can be divided at appropriate locations to produce the individual dosimeters 20. Division of dosimeters 20 is advantageously accomplished using a plastic layer or film 45 which is adhesively applied to the back surface of the substrate. A diamond bladed saw or other means can then be used to saw or otherwise divide as indicated by lines 46. The individual dosimeter units or elements 20 are shown in FIG. 13. The units can be retained upon the plastic backing for ease or convenience in handling since the diamond saw can be set to cut only the substrate and not plastic layer 45. The individual dosimeters are then either used directly or mounted in suitable frames, cases or badges as described above. Alternative structures and methods for mounting the novel dosimeters of this invention are described herein and will also be obvious to those skilled in the art.

FIGS. 14A-14D illustrate a further preferred method for attaching thin layer dosimeter inserts 20 to a structural frame or framework 51. Framework 51 is advantageously provided with two or more apertures 52 which extend therethrough, but could alternatively extend partially through frame 51. A first layer 54 of sealing glass or other inorganic bonding agent is deposited upon the surface of substrate 51 in a shape and size designed to receive and support substrate 21. A second layer 55 of sealing glass or other inorganic bonding agent can be deposited upon the first layer 54. Both layers are advantageously deposited in a manner similar to the preferred method for depositing phosphor-binder onto the substrate 21 as described above with respect to FIGS. 11A-13. A single layer of bonding agent can alternatively be used.

Substrate 21 with phosphor-binder layer 22 is then positioned upon layers 54 and within layer 55. The framework 51, substrate 21, phosphor binder layer 22 and the layers 54 and 55 of inorganic bonding agents 54 and 55 are then exposed to elevated temperatures at or above the sealing or bonding temperatures of layers 54 and 55. Layers 54 and 55 fuse and bond substrate 21 to framework 51 to form an integrated dosimeter as shown in FIG. 14D. Phosphor-binder layer 22 can be either fused or unfused prior to bonding of layers 54 and 55.

Frame 51 is preferably made from beryllium oxide, aluminum oxide or other nearly tissue equivalent ceramic materials having a coefficient of thermal expansion not greatly different from the glass or other material of substrate 56 and the sealing glass or other bonding agent used for layers 54 and 55. A variety of alternative materials may be possible consistent with the requirements of such a dosimeter.

Alternative methods for mounting disometer inserts such as 20 are also clearly possible. The frame of FIG. 5 is provided with a dosimeter insert which is mounted with a high temperature plastic film. Such a mounting structure may be used with frames which have a substantially different coefficient of thermal expansion than the substrate. However, such organic elements of dosimeters 76 cannot withstand high temperature annealing in an oven or using other means where the frame and substrate are heated to temperatures of 300°-400° C. At such temperatures plastic and other organic material typically degrade. According to laser annealing processes newly developed by the inventors hereof, it is no longer necessary to oven anneal but instead localized annealing of the phosphor can be accomplished using a laser beam. Dosimeters and methods according to this invention are useful for making oven annealable dosimeters such as illustrated and explained with respect to FIGS. 14A-14D, and are also useful for making laser annealable dosimeters such as shown in FIGS. 4-6.

The dosimeter of FIGS. 3 and 4 is advantageously made by preparing dosimeter inserts 20 and frame 60. Frame 60 can advantageously be an injection molded plastic member. Inserts 20 are positioned within apertures 63 on the ledges 64 and secured thereon using a suitable adhesive.

The frame of FIG. 5 is constructed by first preparing a dosimeter 20. An inert ring 79 is also made according to well known plastic molding or forming techniques. The insert is positioned within a ledged receiving aperture 73 formed in frame 75. The dosimeter is then positioned within the ring insert 79. A high temperature plastic film or molded piece 75 is adhesively applied to frame 70 and the outer edges of dosimeter 20 holding the dosimeter in location.

The dosimeter of FIG. 6 is constructed by positioning a dosimeter 20 within an aperture 81 formed in frame 80. The portions of frame 80 adjacent to aperture 81 are then thermally formed so that the dosimeter insert 20 is held securely in position.

The invention further includes water and moisture resistant laser readable dosimeters and methods for constructing such dosimeters. Thermoluminescent phosphors are often susceptible to degradation from moisture and other chemicals. The below-described embodiments effectively encapsulate the phosphor to protect from such degradation.

A preferred embodiment of moisture resistant dosimeter is illustrated in FIG. 15. Dosimeter 120 includes a substrate 121 which can advantageously be a thin square of glass having a thickness in the range indicated hereinabove. Substrate 121 has a phosphor-matrix layer 122 formed thereon which has been exaggerated for presentation in FIG. 15. The phosphor matrix layer 122 includes a plurality of phosphor particles 123 and an interposed bonding matrix 124 which is bonded to particles 123 and substrate 121.

The moisture resistive properties of dosimeter 120 are achieved by having a relatively high ratio of inorganic binder to phosphor particles. Ratios of 10:1-1:2 were hereinabove indicated as useful. Mixtures of phosphors to binder of 1:1 or 1:2 are preferred for preparing dosimeter 121 and similar dosimeters in accordance with this invention. The inorganic binder should preferably be ground substantially smaller than the phosphor particles 122, such as by using a 10 micron grain size binder material with a 50 micron grain size phosphor.

Dosimeter 120 is made according to the method of manufacture discussed above with regard to the embodiment of FIGS. 1 and 2. The high temperature fusing and bonding causes the relatively numerous binder particles to soften and flow around and over the phosphor particles 123 thereby effectively coating and bonding the phosphor particles to each other and substrate 121. The glass or other inorganic coating formed by matrix 124 protects the phosphor particles from degradation and deactivation due to exposure to water, airborne moisture, or other degrading substances. Dosimeter 120 can be mounted in suitable frames, cases and in badges as described or taught herein.

Another embodiment moisture resistant dosimeter 130 is shown in FIG. 16. Dosimeter 130 includes a substrate 131 and a bonded phosphor-matrix layer 132 which is bonded to substrate 131 according to the methods described above with respect to FIGS. 1 and 2. The fused phosphor-matrix layer 132 is then overprinted or otherwise coated with a secondary protective layer 133 which is advantageously made from a binder material and a suitable vehicle. Other inorganic overlay materials are also possible for use in forming protective layer 133.

The secondary layer 133 is then heated to the requisite softening temperature or higher thus causing the overprinted binder particles or other overlay material to soften, flow over, fuse and bond to phosphor matrix layer 132 and substrate 131. An encapsulating layer or envelope is formed by the resulting fused and bonded secondary layer 133, thereby protecting the enclosed phosphor particles 134. Dosimeter 130 can be used as indicated above, such as in the form of an insert mounted in a larger frame or case. It can also be used in specialized applications by direct mounting or otherwise as the circumstances dictate.

A further moisture resistant dosimeter 150 is illustrated in FIG. 17. Dosimeter 150 includes a suitable substrate 151 which is advantageously a small thin pane of glass. A phosphor-matrix layer 152 having phosphor particles 153 and a matrix of fused binding material 154 is bonded to substrate 151 and phosphor particles 153.

Dosimeter 150 also includes a glass or other transparent covering piece 155. Covering piece 155 is mounted to substrate 151 using a connecting seal 156 of sealing glass or other inorganic bonding and sealing material. Seal 156 is bonded to cover piece 155 and substrate 151 about the perimeter of cover piece 155 thus forming a sealed inorganic envelope which encapsulates the phosphor-matrix layer 152 protecting it from moisture and physical deterioration.

Dosimeter 150 can be produced by combining selected phosphor particles 153 with inorganic binding material particles and a suitable vehicle. The phosphor-binder-vehicle mixture is then deposited upon the surface of substrate 151, such as using the methods discussed above. A sealing layer can be similarly prepared using a sealing glass and vehicle mixture which is printed or otherwise deposited about the phosphor-matrix layer 152. The protective pane 155 is positioned on the dosimeter over sealing layer 156. The dosimeter 150 is then heated to the sealing temperature of the inorganic sealing glass or other sealing material used to produce seal 156. The seal softens, flows, fuses and bonds to substrate 151 and covering piece 155. Phosphor-matrix layer 152 can be fused either at the same time as seal 156 or prior thereto.

It is noteworthy that in reading dosimeter 150 it may be preferred to heat the phosphor particles by impinging a laser beam such as from a $CO_2$ laser onto the back surface 151$b$ of substrate 151. In general the glass or other cover piece 155 may not be transparent to the infrared laser beam or may be only partially transparent. In such case heating of the phosphor particles may be superior when the substrate is heated and heat flows by conduction through substrate 151 and matrix 154 to particles 153. Cover piece 155 may alternatively be constructed of an infrared transmissive material in which case heating can be by direct radiation onto the phosphor particles with only limited radiation losses.

A still further alternative embodiment dosimeter according to the invention is illustrated in FIGS. 18 and 19. Dosimeter 160 includes a very thin central substrate 161 which is thermally insulated from an outer substrate 162 using a thermal barrier ring 163. Ring 163 is made of material having a relatively low thermal conductivity. Glass is advantageously used for thermal barrier 163. A suitable material for central and outer substrates 161 and 162 is beryllium oxide. Dosimeter 160 is preferably constructed by forming beryllium oxide or other suitable material into a blank 170 shown in FIGS. 20 and 21. Blank 170 includes a central substrate portion 171 having a recessed groove 173 formed around the perimeter adjacent to the connection with the outer substrate portion 172. Groove 173 is filled with molten or dry glass in order to form ring 163. When dry glass particles are used the blank and applied glass are heated so that the glass flows, fuses and bonds to blank 170.

The upper surface 175 of blank 170 is then lapped or otherwise removed until ring 163 is the only connecting element between the central and outer substrate portions. Alternative methods of making dosimeter 160 are also possible.

Dosimeter 160 allows heat to flow across the central substrate 161 because of the relatively good thermal conductivity of BeO. Flow of heat is impeded at the insulating ring 163 thus limiting the laser energy required. The relatively small amount of glass and predominant use of beryllium oxide makes dosimeter 160 nearly tissue equivalent. Dosimeter 160 can be mounted in a variety of frames or cases such as a indicated hereinabove or may be used separately.

EXAMPLE 1

Glass substrate squares made of Corning Type 0211 glass were formed with sides 25 mm long, using standard glass cutting techniques. The square panes had a thickness of 0.1–0.2 mm. The cut substrate squares were prepared by washing in water and drying using a lint-free cloth. Calcium sulfate doped with dysprosium ($CaSO_4$:Dy), grain size 25–150 microns was selected as the phosphor material. Corning Type 7555 glass frit having a grain size of 10–20 microns was selected as the inorganic binder. 1.2 grams of the glass frit was mixed with 1.3 grams of $CaSO_4$:Dy phosphor particles, and 0.6 grams of pine oil and ethylcellulose printing vehicle, to form a paste. The resulting phosphor-binder-vehicle mixture was spread onto the glass substrate squares using a tool having a slot with a slot height of 200 microns. The deposited phosphor-binder-vehicle layer was allowed to dry at 100° C. and then portions of the layer were removed to define individual dosimeter spots. Thereafter the substrate and applied layer was heated to 400° C. for one hour to volatilize the vehicle polymers and drive off any residual vehicle solvent. Thereafter the substrate and applied layer were heated to 425° C. for 15 minutes to begin softening the glass frit binder, and 500° C. for an additional 15 minutes to provide wetting, fusion, and subsequent bonding of the glass frit binder to the substrate and phosphor particles upon cooling.

EXAMPLE 2

Glass substrate squares were prepared as in Example 1. A phosphor binder-vehicle mixture was formed of the same constituents as in Example 1 in the following amounts: 2.3 grams $CaSO_4$:Dy; 1.15 grams glass frit; and 1.35 grams vehicle. The constituents were shaken for 15 minutes using a vibratory mixer. The resulting mixture was spread on the substrate squares using a grooved tool to produce layer thicknesses of approximately 100 and 200 microns. The substrates and deposited layers of phosphor-binder-vehicle mixture were dried at 100° C. for approximately 1 hour. The substrates with applied layers were then heated to 380° C. to complete volatilization of most of the vehicle. Thereafter complete burnout of the vehicle was accomplished at a heat of 425° C. for 15 additional minutes. The 425° C. temperature also softened the inorganic binder. The temperature was then raised to 500° C. to completely soften the binder and provide good interstitial wetting with the phosphor particles and substrate. The substrate was then cooled to bond the phosphor particles into a phosphor-binder matrix bonded to the substrate.

EXAMPLE 3

The same procedure of Example 2 was followed using lithium fluoride phosphor (LiF) in lieu of $CaSO_4$:Dy.

EXAMPLE 4

The same procedure of Example 2 was followed using lithium borate ($Li_2B_4O_7$) in lieu of $CaSO_4$:Dy.

EXAMPLE 5

The procedure of Example 2 was followed using $CaSO_4$:Dy phosphor having a particle size of less than 40 microns. Phosphor in the amount of 0.8 gram was mixed with 0.4 gram of the same glass frit and 0.45 gram of the same vehicle. The phosphor-binder-vehicle mixture was spread approximately 100 microns thick which resulted in a bonded dosimeter layer having 9–10 milligrams/$cm^2$.

EXAMPLE 6

The procedure of Example 2 was followed using lithium fluoride with grain size of 20–30 microns. Structural integrity and bonding of the resulting phosphor-binder matrix layer was found superior to similar dosimeters prepared in Example 4 using the 25–150 micron LiF phosphor grains.

EXAMPLE 7

A phosphor-binder-vehicle mixture was prepared using 15 grams $CaSO_4$:Dy (grain size 40–60 microns); 7.5 grams Type 7555 glass frit (grain size 10–20 microns); and 6 grams ethylcellulose and pine oil vehicle. The mixture was printed through a stainless steel screen having cutout portions onto 25 mm square glass substrate similar to those described in Example 1, having thicknesses of 0.12 and 0.3 mm. The screen formed deposited layers which were dried at 90° C. for approximately one hour and then placed in a belt furnace having four temperature zones set to 400° C., 475° C., 475° C. and 400° C., for a total high temperature heating time of approximately one hour.

EXAMPLE 8

The procedure of Example 7 was followed using 25 grams $CaSO_4$:Dy (grain size less than 30 micron); 12.5 grams 7555 glass frit; and 8 grams of same vehicle.

EXAMPLE 9

The procedure of Example 7 was followed using 2 grams calcium fluoride phosphor doped with manganese ($CaF_2$:Mn) (particle size 20–30 microns); 1 gram 7555 glass frit (10–20 microns); and 1 gram Electro-Science Laboratories Type 414 vehicle.

EXAMPLE 10

The procedure of Example 7 was followed using LiF in lieu of $CaSO_4$:Dy. The firing temperatures were 400°-550°-550°-400° C. in lieu of those indicated in Example 7.

EXAMPLE 11

The procedure of Example 10 was followed using 18 grams $CaSO_4$:Dy (less than 40 microns); 9 grams glass frit (10–20 microns) and 10 grams type 414 vehicle. Different layer thicknesses were produced using different screen types. Layer thicknesses of 4, 6, 9, 12 and 15 milligram/$cm^2$ were obtained. The 25 mm square substrates were sawn into 6 mm squares each having a printed spot of phosphor-binder, using a diamond bladed saw. The 6 mm square dosimeters were further processed by heating to 600° C. to anneal residual stresses from earlier processing. The individual dosimeters were then mounted on beryllium oxide and aluminum frames as described hereinabove and then tested.

EXAMPLE 12

The procedures of Example 7 were followed using a pane of BeO, approximately 0.12 mm thick, for the substrate. The BeO substrate was cooled and mounted to a BeO frame using the Type 7555 glass frit. The glass frit was mixed with a pine oil-ethylcellulose and then deposited onto the frame at appropriate locations to receive the extreme edges of the substrate. The substrate, frame and vehicle-binder mixture were then fired to bond the substrate and glass using temperatures similar to those indicated above.

EXAMPLE 13

Corning Experimental Glass Type 869AVW was mixed with Type 400 ElectroScience Laboratories vehicle using approximately equal amounts by weight. The resulting mixture was deposited onto Corning Type 0211 glass panes having thickness of 5, 7 and 9 mils. Lithium fluoride phosphor particles (TLD 100) having grain sizes of approximately 30–60 microns, were then dusted onto the deposited vehicle-binder layers before the vehicle solvent had dried. Part of the phosphor particles adhered to the vehicle-binder layer and remained despite shaking of the substrate in an angled position. The vehicle solvent was then allowed to dry and the dosimeter was placed in the 4 zone belt furnace and fired to temperatures of 425°–550° C. to cause fusing and bonding of the glass binder to the substrate and applied phosphor particles. The resulting dosimeters exhibited superior resistance to thermal cracking and good sensitivity to radiation.

In compliance with the statue, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. A laser readable dosimeter for thermoluminescent radiation dosimetry which is capable of withstanding high temperature gradients and relatively high temperatures generated during laser heating with low laser power requirements and resistance to physical degradation, comprising:
   a substrate made from a nonporous ceramic having a relatively insignificant thermoluminescent output; said substrate having a thickness in the range of 50–100 microns;
   at least one phosphor-binder layer bonded to the substrate; said phosphor-binder layer being less than 200 microns in thickness; said phosphor-binder layer including a suitable thermoluminescent phosphor composition and an inorganic glass binder; said glass binder being bonded to the substrate and to particles of the thermoluminescent phosphor according to a process which raises the binder to a temperature in excess of a softening temperature of the glass binder and then cools the binder below said softening temperature thus serving to hold particles of the thermoluminescent phosphor composition in position on the substrate.

2. The dosimeter of claim 1 wherein the substrate is at least partially made from a transparent glass.

3. The dosimeter of claim 1 wherein the substrate is approximately 50–200 microns in thickness adjacent said phosphor-binder layer.

4. The dosimeter of claim 1 wherein the phosphor-binder layer has a surface density approximately in the range of 1 to 30 milligrams of thermoluminescent phosphor composition per square centimeter of said layer.

5. The dosimeter of claim 1 wherein the phosphor-binder layer is made with particles of thermoluminescent phosphor composition having grain sizes approximately in the range of 1–100 microns.

6. The dosimeter of claim 1 further including at least one coating of reflective material applied to the substrate.

7. The dosimeter of claim 6 wherein the coating of reflective material is between the substrate and the phosphor-binder layer.

8. The dosimeter of claim 1 further including at least one coating of radiation affecting material upon the substrate on a back surface opposite to a front surface onto which the phosphor-binder layer is bonded.

9. The dosimeter of claim 1 wherein the substrate is made at least partially from beryllium oxide.

10. The dosimeter of claim 1, wherein the substrate includes at least one ceramic chosen from the group consisting of inorganic glasses, beryllium oxide, aluminum oxide, lithium fluoride, and boron nitride.

11. The dosimeter of claim 1 wherein the substrate and inorganic glass binder have coefficients of thermal expansion which are approximately within a range defined by a factor of two.

12. The dosimeter of claim 1 wherein the substrate comprises two parts; a first part centrally located within a second part; said second part having a relatively lower thermal conductivity compared to the first part and serving to thermally isolate said first part; said phosphor-binder layer being bonded to said first part.

13. The dosimeter of claim 12 wherein the first part is beryllium oxide and the second part is a glass.

14. The dosimeter of claim 1 further comprising a moisture-resistant protective envelope enclosing the phosphor-binder layer.

15. The dosimeter of claim 1 further comprising a moisture-resistant protective envelope connected to the substrate and enclosing the phosphor-binder layer.

16. The dosimeter of claim 15 wherein the moisture-resistant protective envelope is formed by overlaying the phosphor-binder layer with a protective layer of glass which is heated to soften and fuse the protective layer to contacting portions of the phosphor-binder layer and substrate.

17. The dosimeter of claim 1 further comprising a moisture-resistant protective envelope formed by the process of overlaying the phosphor-binder layer with an over-layer of glass and heating above a softening temperature of said over-layer of glass to soften and fuse the over-layer to contacting portions of the phosphor-binder layer and substrate.

18. The dosimeter of claim 1, wherein:
   the thermoluminescent phosphor composition is chosen from the group consisting of $CaSO_4$, $Li_2B_4O_7$, $LiF$, $CaF_2$, $BeO$, $Al_2O_3$, and $MgB_4O_7$, appropriately doped with Dy, Tm, Cu, Ag, Mn, Mg, Ti, or Sm.

19. A method for producing a layer readable thermoluminescent radiation dosimeter capable of withstanding the high temperature gradients and temperatures in excess of 400° C. which are generated during rapid layer heating, comprising:
   selecting at least one particulate thermoluminescent phosphor composition containing at least some thermoluminescent phosphor material;
   selecting at least one particulate inorganic glass binder composition having a softening temperature in excess of 400° C.;
   selecting at least one liquid printing vehicle;
   mixing the selected phosphor composition, glass binder composition and printing vehicle to form a phosphor-binder-vehicle mixture;
   selecting a suitable inorganic substrate having a thickness of less than 1000 microns adjacent to thermoluminescent phosphor layer locations;
   positioning a mask having mask openings therethrough adjacent the substrate with the mask openings located at desired thermoluminescent phosphor layer locations;
   depositing the phosphor-binder-vehicle mixture through the mask openings and onto the substrate to form phosphor-binder-vehicle deposits thereon;
   heating the substrate and deposited phosphor-binder-vehicle deposits to volatilize the vehicle from said deposits;
   heating the substrate and deposited phosphor-binder-vehicle deposits to substantially pyrolyze any remaining portions of the vehicle;
   heating the substrate and deposited phosphor-binder-vehicle deposits to a temperature in excess of said softening temperature of the glass binder composition to cause the particulate glass binder composition to soften and fuse with the substrate and particulate thermoluminescent phosphor;

cooling the substrate and remaining portions of the phosphor-binder-vehicle deposits to form a dosimeter with a phosphor-binder matrix heat bonded to the substrate.

20. The method of claim 19 wherein selecting particulate thermoluminescent phosphor composition and selecting particulate inorganic glass binder composition are both limited to selecting particles generally less than 100 microns in size.

21. The method of claim 19 wherein selecting particulate thermoluminescent phosphor composition and selecting particulate inorganic glass binder composition are both limited to selecting particles generally between 1 and 100 microns in size.

22. The method of claim 21 wherein selected particles of the inorganic glass binder composition are generally smaller in size than selected particles of the thermoluminescent phosphor composition.

23. The method of claim 19 wherein selecting particlate thermoluminescent phosphor composition and selecting particulate inorganic glass binder composition are both limited to selecting particles generally between 10 and 60 microns in size.

24. The method of claim 19 wherein selected particles of the inorganic glass binder composition are generally smaller in size than selected particles of the thermoluminescent phosphor composition.

25. The method of claim 19 wherein ratios of thermoluminescent phosphor material to inorganic glass binder composition are approximately in the range of 10:1 to 1:2.

26. The method of claim 19 wherein ratios of thermoluminescent phosphor material to inorganic glass binder composition are approximately 4:1.

27. The method of claim 19 wherein the thermoluminescent phosphor material is selected to include at least one material from the group consisting of LiF; $Li_2B_4O_7$; $CaSO_4$; $CaF_2$; $MgB_4O_7$; $Al_2O_3$; BeO.

28. The method of claim 19 wherein the substrate and the inorganic glass binder composition are selected to have coefficients of thermal expansion which are within one order of magnitude of each other.

29. The method of claim 19 wherein the substrate and the inorganic glass binder composition are selected to have coefficients of thermal expansion which are within a factor of two of each other.

30. The method of claim 19 wherein the substrate is selected to be at least partially made of inorganic glass.

31. The method of claim 19 further including a step of overlaying deposited phosphor-binder-vehicle mixture with a water-resistant inorganic glass overlay material.

32. The method of claim 31 wherein the step of overlaying occurs after heat bonding of the substrate and phosphor-binder matrix, and wherein the overlaying inorganic glass material is heated to bond the inorganic glass overlay material to deposited and bonded phosphor-binder matrix.

33. The method of claim 19 further comprising mounting the substrate and bonded phosphor-binder matrix in a dosimeter frame made of substantially tissue-equivalent material.

34. The method of claim 33 wherein the dosimeter frame and substrate are bonded by fusing a sealing material therebetween.

35. A method for producing a laser readable thermoluminescent radiation dosimeter capable of withstanding high temperature gradients and temperatures in excess of 400° C. which are generated during rapid layer heating, comprising:

selecting at least one particulate thermoluminescent phosphor composition containing at least some thermoluminescent phosphor material;

selecting at least one particulate inorganic glass binder composition having a softening temperature in excess of 400° C.;

selecting at least one liquid printing vehicle;

mixing the selected particulate inorganic glass binder composition and liquid printing vehicle to form a binder-vehicle mixture;

selecting a suitable inorganic substrate having a thickness of less than 1000 microns adjacent to thermoluminescent phosphor layer locations;

positioning a mask having mask openings therethrough adjacent the substrate with the mask openings located at desired thermoluminescent phosphor layer locations;

depositing the binder-vehicle mixture through the mask openings and onto the substrate to form binder-vehicle deposits thereon;

depositing selected particulate thermoluminescent phosphor composition onto binder-vehicle deposits to form phosphor-binder-vehicle deposits;

heating the substrate and deposited phosphor-binder-vehicle deposits to volatilize the vehicle from said deposits;

heating the substrate and deposited phosphor-binder-vehicle deposits to substantially pyrolyze any remaining portions of the vehicle;

heating the substrate and deposited phosphor-binder-vehicle deposits to a temperature in excess of said softening temperature of the glass binder composition to cause the particulate glass binder composition to soften and fuse with the substrate and particulate thermoluminescent phosphor;

cooling the substrate and remaining portions of the phosphor-binder-vehicle deposits to form a dosimeter with a phosphor-binder matrix heat bonded to the substrate.

36. The method of claim 35 and further defined by removing excess unadhered particulate thermoluminescent phosphor composition prior to heating.

37. The method of claim 35 wherein selected particles of the thermoluminescent phosphor composition and inorganic glass binder composition are generally less than 100 microns in diameter.

38. The method of claim 35 wherein selected particles of the thermoluminescent phosphor composition and inorganic glass binder composition are generally between 1 and 100 microns in size.

39. The method of claim 38 wherein selected particles of the inorganic glass binder composition are generally smaller in size than particles of the thermoluminescent phosphor composition.

40. The method of claim 35 wherein selected particles of the thermoluminescent phosphor composition and inorganic glass binder composition are generally between 10 and 60 microns in diameter.

41. The method of claim 35 wherein selected particles of the inorganic glass binder composition are generally smaller in size than particles of the thermoluminescent phosphor composition.

42. The method of claim 35 wherein the method is practiced using ratios of thermoluminescent phosphor material to inorganic glass binder composition which are approximately in the range of 10:1 to 1:2.

43. The method of claim 35 wherein the method is practiced using ratios of thermoluminescent phosphor material to inorganic glass binder composition which are approximately 4:1.

44. The method of claim 35 wherein the thermoluminescent phosphor material is selected to include at least one material from the group consisting of LiF; $Li_2B_4O_7$; $CaSO_4$; $CaF_2$; $MgB_4O_7$; $Al_2O_3$; BeO.

45. The method of claim 35 wherein the substrate and the inorganic glass binder composition are selected to have coefficients of thermal expansion which are within one order of magnitude of each other.

46. The method of claim 35 wherein the substrate and the inorganic glass binder composition have coefficients of thermal expansion which are within a factor of two of each other.

47. The method of claim 35 wherein the substrate is selected to be at least partially made of glass.

48. The method of claim 35 further including a step of overlaying deposited phosphor-binder-vehicle mixture with a water-resistant inorganic glass overlay material.

49. The method of claim 48 wherein the step of overlaying occurs after heat bonding of the substrate and phosphor-binder matrix, and wherein the overlaying inorganic glass material is heated to bond the inorganic glass overlay material to deposited and bonded phosphor-binder mixture.

50. The method of claim 35 further comprising mounting the substrate and bonded phosphor-binder matrix in a dosimeter frame made of substantially tissue-equivalent material.

51. The method of claim 50 wherein the dosimeter frame and substrate are bonded by fusing a sealing material therebetween.

52. A laser readable dosimeter for thermoluminescent radiation dosimetry which is capable of withstanding the high temperature gradients and temperatures in excess of 400° C. generated during rapid laser heating with reduced laser power requirements and resistance to physical degradation, comprising:
 a ceramic substrate having a relatively insignificant thermoluminescent output; said substrate having a thickness less than approximately 1000 microns;
 at least one phosphor-binder layer bonded to the substrate according to the following process:
  (a) depositing a mixture containing particulate thermoluminescent phosphor, particulate glass binder composition, and a liquid vehicle through apertures in a mask to provide at least one layer of desired shape and thickness on the substrate at at least one location;
  (b) heating the substrate and deposited phosphor, binder composition and vehicle to substantially remove the vehicle therefrom;
  (c) heating the substrate and resulting mixture to a temperature in excess of 400° C. and in excess of a softening temperature of the particulate glass binder compositions at which said particulate glass binder softens and fuses to the substrate and particulate thermoluminescent phosphor;
  (d) cooling the heated substrate, binder and phosphor from the previous step to bond the glass binder to the substrate and particulate thermoluminescent phosphor to form at least one phosphor-binder layer heat bonded to the substrate.

53. A laser readable dosimeter according to claim 52 wherein said process utilizes particulate thermoluminescent phosphor and particulate glass binder composition which both generally have particle sizes less than 100 microns.

54. A laser readable dosimeter according to claim 53 wherein said process utilizes particulate glass binder composition which is generally smaller in particle size than the particulate thermoluminescent phosphor.

55. A laser readable dosimeter for thermoluminescent radiation dosimetry which is capable of withstanding the high temperature gradients and temperatures in excess of 400° C. generated during rapid laser heating with reduced laser power requirements and resistance to physical degradation, comprising:
 a substrate made from glass and having a relatively insignificant thermoluminescent output; said substrate having a thickness in the range of approximately 50–1000 microns; said substrate being made from glass which has a softening temperature in excess of 500° C.;
 at least one phosphor-binder layer bonded to the substrate according the following process:
  (a) depositing a mixture of particulate thermoluminescent phosphor, particulate glass binder composition, and a liquid vehicle through apertures in a mask to provide layers of desired shape and thickness on the substrate at at least one location;
  (b) heating the substrate and deposited mixture to substantially remove the liquid vehicle from the deposited mixture;
  (c) heating the substrate and mixture to a temperature in excess of 400° C. and in excess of a softening temperature of the particulate glass binder composition at which said particulate glass binder softens and fuses to the substrate and particulate thermoluminescent phosphor;
  (d) cooling the substrate and mixture from the previous step to bond the glass binder composition to the substrate and particulate thermoluminescent phosphor to form at least one phosphor-binder layer.

56. A laser readable dosimeter according to claim 55 wherein said process utilizes particulate thermoluminescent phosphor and particulate glass binder composition which both generally have particle sizes less than 100 microns.

57. A laser readable dosimeter according to claim 56 wherein said process utilizes particulate glass binder composition which is generally smaller in particle size than the particulate thermoluminescent phosphor.

58. A laser readable dosimeter for thermoluminescent radiation dosimetry which is capable of withstanding the high temperature gradients and temperatures in excess of 400° C. generated during rapid laser heating with reduced laser power requirements and resistance to physical degradation, comprising:
 a ceramic substrate having a relatively insignificant thermoluminescent output; said substrate having a thickness less than approximately 1000 microns;
 at least one phosphor-binder layer bonded to the substrate according to the following process:
  (a) depositing a mixture containing particulate glass binder composition and a liquid vehicle through apertures in a mask to provide at least one layer of desired shape and thickness on the substrate at at least one location;

(b) depositing particulate thermoluminescent phosphor on the deposited mixture of the previous step;

(c) heating the substrate, deposited phosphor and deposited binder composition and vehicle to substantially remove the vehicle therefrom;

(d) heating the substrate and resulting mixture to a temperature in excess of 400° C. and in excess of a softening temperature of the particulate glass binder composition at which said particulate glass binder softens and fuses to the substrate and particulate thermoluminescent phosphor;

(e) cooling the heated substrate, binder and phosphor from the previous step to bond the glass binder to the substrate and particulate thermoluminescent phosphor to form at least one phosphor-binder layer heat bonded to the substrate.

59. A laser readable dosimeter according to claim 58 wherein said process utilizes particulate thermoluminescent phosphor and particulate glass binder composition which both generally have particle sizes less than 100 microns.

60. A laser readable dosimeter according to claim 59 wherein said process utilizes particulate glass binder composition which is generally smaller in size than the particulate thermoluminescent phosphor.

61. A laser readable dosimeter for thermoluminescent radiation dosimetry which is capable of withstanding the high temperature gradients and temperatures in excess of 400° C. generated during rapid laser heating with reduced laser power requirements and resistance to physical degradation comprising:

a substrate made from glass and having a relatively insignificant thermoluminescent output; said substrate having a thickness in the range of approximately 50–100 microns; said substrate being made from glass which has a softening temperature in excess of 500° C.;

at least one phosphor-binder layer bonded to the substrate according to the following process:

(a) depositing a mixture containing particulate glass binder composition and a liquid vehicle through apertures in a mask to provide at least one layer of desired shape and thickness on the substrate at at least one location;

(b) depositing particulate thermoluminescent phosphor on the deposited mixture of the previous step;

(c) heating the substrate, deposited phosphor and deposited binder composition and vehicle to substantially remove the vehicle therefrom;

(d) heating the substrate and resulting mixture to a temperature in excess of 400° C. and in excess of a softening temperature of the particulate glass binder composition at which said particulate glass binder softens and fuses to the substrate and particulate thermoluminescent phosphor;

(e) cooling the heated substrate, binder and phosphor from the previous step to bond the glass binder to the substrate and particulate thermoluminescent phosphor to form at least one phosphor-binder layer heat bonded to the substrate.

62. A laser readable dosimeter according to claim 61 wherein said process utilizes particulate thermoluminescent phosphor and particulate glass binder composition which both generally have particle sizes less than 100 microns.

63. A laser readable dosimeter according to claim 62 wherein said process utilizes particulate glass binder composition which is generally smaller in particle size than the particulate thermoluminescent phosphor.

64. A laser readable dosimeter for thermoluminescent radiation dosimetry which is capable of withstanding the high temperature gradients and temperatures in excess of 400° C. generated during laser heating with reduced laser power required and resistance to physical degradation, comprising:

a substrate made from glass and having a relatively insignificant thermoluminescent output; said substrate having a thickness in the range of approximately less than 200 microns; said substrate being made from glass which has a softening temperature in excess of 500° C.;

at least one phosphor-binder layer bonded to the substrate; said phosphor-binder layer being less than 100 microns in thickness to minimize thermal capacity and thermal stresses for easier laser heating; said phosphor-binder layer including a suitable thermoluminescent phosphor composition in grains of size generally in the range of 1–100 microns; said phosphor-binder layer including at least one glass binder having a softening temperature less than the softening temperature of said substrate and in excess of 400° C.;

said substrate and said glass binder having coefficients of thermal expansion which are within a factor of two relative to one another to minimize degradation of the dosimeter during the rapid heating and high thermal gradients developed during laser heating.

* * * * *